(12) United States Patent
Venkumahanti et al.

(10) Patent No.: US 8,341,353 B2
(45) Date of Patent: Dec. 25, 2012

(54) SYSTEM AND METHOD TO ACCESS A PORTION OF A LEVEL TWO MEMORY AND A LEVEL ONE MEMORY

(75) Inventors: Suresh K. Venkumahanti, Austin, TX (US); Christopher Edward Koob, Round Rock, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 12/687,552

(22) Filed: Jan. 14, 2010

(65) Prior Publication Data
US 2011/0173391 A1    Jul. 14, 2011

(51) Int. Cl.
*G06F 12/08* (2006.01)
(52) U.S. Cl. ............... 711/122; 711/120; 711/E12.042; 711/E12.043
(58) Field of Classification Search ............... 711/122, 711/129, E12.042, E12.043, E12.044, E12.046, 711/120
See application file for complete search history.

(56) References Cited

U.S. PATENT DOCUMENTS

| | | | |
|---|---|---|---|
| 5,740,399 A | 4/1998 | Mayfield et al. | |
| 5,822,755 A | 10/1998 | Shippy | |
| 5,832,534 A | 11/1998 | Singh et al. | |
| 5,895,487 A | 4/1999 | Boyd et al. | |
| 5,905,999 A | 5/1999 | Liu et al. | |
| 6,122,674 A | 9/2000 | Olnowich | |
| 6,205,537 B1 | 3/2001 | Albonesi | |
| 6,427,188 B1 * | 7/2002 | Lyon et al. ................ | 711/122 |
| 6,430,655 B1 | 8/2002 | Courtright et al. | |
| 6,606,686 B1 * | 8/2003 | Agarwala et al. ........... | 711/129 |
| 6,886,078 B1 | 4/2005 | Roy | |
| 7,293,141 B1 * | 11/2007 | Donley ..................... | 711/118 |
| 2003/0093622 A1 * | 5/2003 | Desota et al. ............. | 711/129 |
| 2005/0033920 A1 * | 2/2005 | DeLan ..................... | 711/118 |
| 2006/0041720 A1 * | 2/2006 | Hu et al. .................. | 711/136 |
| 2007/0156963 A1 * | 7/2007 | Chen et al. ................ | 711/130 |
| 2007/0282928 A1 * | 12/2007 | Jiao et al. ................. | 707/204 |
| 2008/0125816 A1 | 5/2008 | Jackson | |
| 2008/0126716 A1 * | 5/2008 | Daniels .................... | 711/154 |
| 2008/0215816 A1 * | 9/2008 | Emma et al. .............. | 711/122 |
| 2009/0138658 A1 * | 5/2009 | Dreslinski et al. .......... | 711/118 |
| 2010/0005242 A1 | 1/2010 | Cantin | |
| 2010/0115204 A1 * | 5/2010 | Li et al. ................... | 711/130 |
| 2010/0191913 A1 * | 7/2010 | Chlipala et al. ........... | 711/122 |
| 2010/0191990 A1 * | 7/2010 | Zhang et al. .............. | 713/320 |
| 2011/0072214 A1 * | 3/2011 | Li et al. ................... | 711/124 |

FOREIGN PATENT DOCUMENTS

WO    WO2005101213 A2    10/2005

OTHER PUBLICATIONS

"International Search Report and Written Opinion—PCT/US2011/021368—ISA/EPO—Apr. 18, 2011".

* cited by examiner

*Primary Examiner* — Hal Schnee
(74) *Attorney, Agent, or Firm* — Peter Michael Kamarchik; Nicholas J. Pauley; Jonathan T. Velasco

(57) ABSTRACT

A system and method to access data from a portion of a level two memory or from a level one memory is disclosed. In a particular embodiment, the system includes a level one cache and a level two memory. A first portion of the level two memory is coupled to an input port and is addressable in parallel with the level one cache.

27 Claims, 5 Drawing Sheets

SYSTEM AND METHOD TO ACCESS A PORTION OF A LEVEL TWO MEMORY AND A LEVEL ONE MEMORY

I. FIELD

The present disclosure is generally related to accessing a portion of a level two memory and a level one memory.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Modern computing devices can use cache memory to replicate data stored in main memory of the computing device. The cache memory may be accessed in a shorter period of time than is required to access the main memory of the computing device. Because the cache memory may be accessed in a shorter period of time than is required to access the main memory of the computing device, performance of the computing device may be improved by performing faster memory accesses from cache memory rather than slower memory accesses from main memory. Cache memory may be divided into multiple levels, such as a first level cache and a second level cache. When a memory access request is received, the first level cache is initially searched for the data specified in the memory access request. If the data specified in the memory access request is not found in the first level cache, the second level cache may subsequently be searched for the data specified in the memory access request. Because space may be limited in modern computing devices, the size of a first level cache may be limited. Likewise, the size of the second level cache may also be limited, although the second level cache is frequently larger than the first level cache.

III. SUMMARY

An effective size of a level one memory may be increased by treating a selected portion of a level two memory as if it were part of the level one memory. Memory access requests that are directed to the level one memory may also be directed to the selected portion of the level two memory. The selected portion of the level two memory may therefore be searched for data specified in a memory access request at the same time that the level one memory is searched for data specified in the memory access request. The level two memory might be larger than the level one memory. The selected portion of the level two memory is selected so that accessing the selected portion of the level two memory occurs in an amount of time that is less than or equal to the amount of time needed to access data from the level one memory. As a result, the effective size of the level one memory may be increased without an increase in the amount of time needed to access the level one memory.

In a particular embodiment, the selected portion of the level two memory is physically located proximal to the level one memory and is configured for use as an extension of the level one memory. Because memory access requests that are directed to a level one memory may also be sent to the selected portion of the level two memory, selecting a portion of the level two memory that is physically located proximal to the level one memory may reduce the amount of wiring that the memory access request will have to travel over to be received at the selected portion of the level two memory, thereby reducing the amount of time needed to transmit the memory access request to the level two memory. In addition, when data is retrieved from the selected portion of the level two memory, the amount of wiring that the data will have to travel over to be received at the output of the level one memory may also be reduced as a result of the close proximity between the level one memory and the selected portion of the level two memory.

In a particular embodiment, an apparatus is disclosed that includes a level one cache and a level two memory. A first portion of the level two memory is coupled to an input port and is addressable in parallel with the level one cache.

In another particular embodiment, a method is disclosed that includes receiving a memory access request and distributing the memory access request to a memory system. The memory system includes a level one memory and a sub-portion of a memory. The method includes selectively providing data from either the level one memory or the sub-portion of the memory.

In another particular embodiment, an apparatus is disclosed that includes means for storing data for a first level access at a multi-level access memory system. The apparatus further includes means for storing data for a second level access at the multi-level memory system. A portion of the means for storing data for the second level access is coupled to an input port and is addressable in parallel with the means for storing data for the first level access One particular advantage provided by at least one of the disclosed embodiments is that the amount of memory that is accessible as a level one memory is increased in comparison to devices that do not access a portion of a level two memory in response to level one memory requests. Because a portion of a level two memory is accessed as if it were a level one memory, an amount of memory that can effectively function as level one memory is increased, without dedicating additional physical space to a level one memory.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
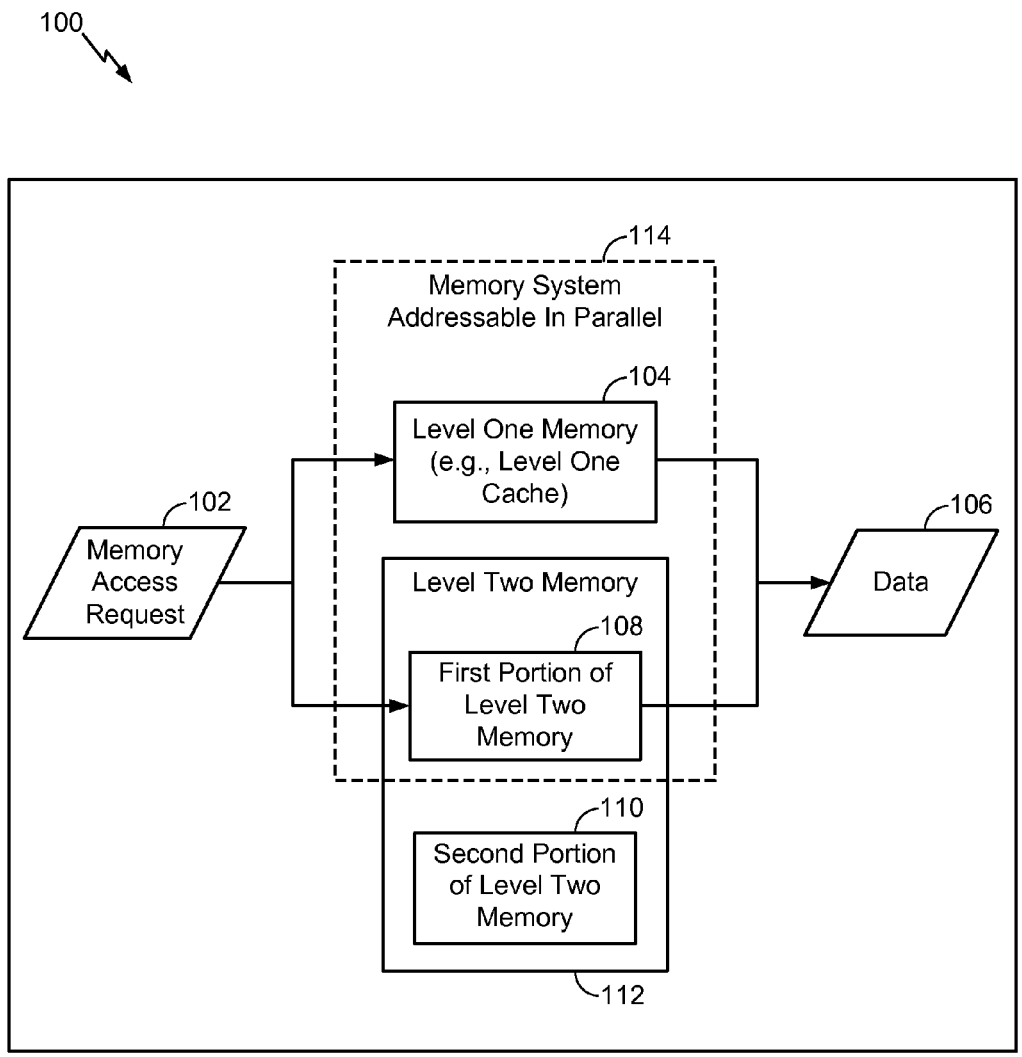
FIG. 1 is a block diagram of a particular illustrative embodiment of an apparatus configured to access a portion of a level two memory and a level one memory.

Referring to FIG. 1, a particular illustrative embodiment of an apparatus configured to access a portion of a level two memory and a level one memory is disclosed and generally designated 100. The apparatus 100 includes a level one memory 104, such as a level one cache, and also includes a level two memory 112. The level two memory 112 includes a first portion 108 and a second portion 110. The first portion 108 of the level two memory 112 and the level one memory 104 are addressable in parallel so that the level one memory 104 and the first portion 108 of the level two memory 112 may operate as a memory system 114. Because the level one memory 104 and the first portion 108 of the level two memory 112 are addressable in parallel, a memory access request 102 that is directed to the level one memory 104 may also be delivered to the first portion 108 of the level two memory 112. Delivering the memory access request 102 to the first portion 108 of the level two memory 112 may be carried out, for example, by coupling a signal line that carries the memory access request 102 to the level one memory 104 to an input port to the first portion 108 of level two memory 112.

The respective sizes of the first portion 108 of the level two memory 112 and the second portion 110 of the level two memory 112 may be established based on an access time associated with the level one memory 104. For example, the size of the first portion 108 of the level two memory 112 and the proximity of the first portion 108 to the level one memory 104 may be established so that the first portion 108 of the level two memory 112 may be accessed in the same amount of time that the level one memory 104 can be accessed. In a particular embodiment, a first data read latency of the level one memory 104 is a same number or a greater number of processor cycles as a second data read latency of the first portion 108 of the level two memory 112.

During operation, a memory access request 102 may be provided concurrently to the level one memory 104 and to the first portion 108 of the level two memory 112. The memory access request 102 may be, for example, a request to access data stored at a specified address or a request to access an instruction stored at a specified address. The level one memory 104 and the first portion 108 of the level two memory 112 may be searched to determine whether the level one memory 104 or the first portion 108 of the level two memory 112 includes data corresponding to the data requested by the memory access request 102. When the level one memory 104 or the first portion 108 of the level two memory 112 contains data corresponding to the data requested by the memory access request 102, data 106 corresponding to the data requested by the memory access request 102 may be provided from the level one memory 104 or from the first portion 108 of the level two memory 112. When the level one memory 104 and the first portion 108 of the level two memory 112 do not contain data corresponding to the data requested by the memory access request 102, the memory access request 102 may be considered a level one cache miss and the memory access request 102 or a different memory access request may be forwarded to the level two memory 112 and the second portion 110 of the level two memory 112 may be searched for the requested data.

Because a portion of a level two memory is accessed as if it were a level one memory, the amount of memory in the apparatus 100 that is accessible as a level one memory is increased. As a result, the amount of memory that can effectively function as level one memory is increased without dedicating additional physical space to the level one memory 104.

Figure 2:
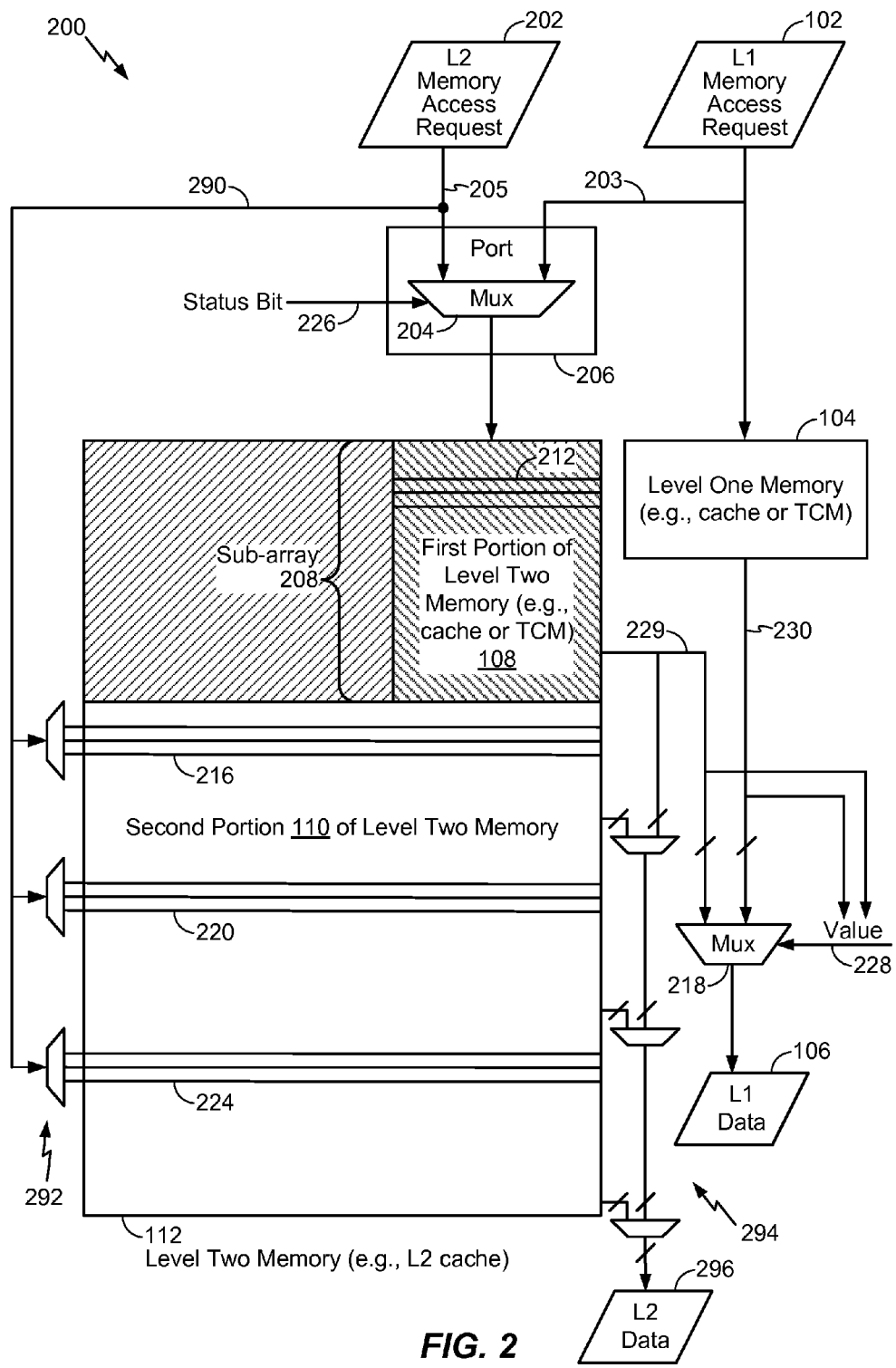
FIG. 2 is a block diagram of a second illustrative embodiment of an apparatus configured to access a portion of a level two memory and a level one memory.

Referring to FIG. 2, a particular illustrative embodiment of an apparatus configured to access a portion of a level two memory and a level one memory is disclosed and generally designated 200. The apparatus 200 includes the level one memory 104 and the level two memory 112. The apparatus 200 also includes an input port 206 configured to receive one or more memory access requests and an output multiplexer 218. The level one memory 104 may be a cache, such as a data cache or an instruction cache. In an alternative embodiment, the level one memory 104 may be a tightly coupled memory (TCM). The level two memory 112 may be a level two cache, a TCM, an array-based memory, or any other form of computer memory. The level two memory 112 includes the first portion 108 of the level two memory 112. For example, the first portion 108 of the level two memory 112 may be a sub-array 208 of multiple arrays within the level two memory 112. In addition, the first portion 108 of the level two memory 112 may be located physically proximal to the level one memory 104. All memory in the level two memory 112 that is not included as part of the first portion 108 of the level two memory 112 may be characterized as a second portion 110 of the level two memory 112. A first set of selection elements 292 is coupled to the second portion 110 to provide a L2 memory access request 202 to the second portion 110 via a signal line 290. The first set of selection elements 292 may include circuitry configured to selectively propagate a signal received via the signal line, such as an address signal, along one or more address lines 216, 220, and 224. For example, in the illustrated embodiment, the first set of selection elements 292 includes a set of demultiplexers. A second set of selection elements 294, illustrated as multiplexers, is coupled to the second portion 110 to provide a result of the L2 memory access request 202 as L2 data 296.

In the embodiment depicted in FIG. 2, a first data read latency of the level one memory 104 is a first number of processor cycles and a second data read latency of the first portion 108 of the level two memory 112 is a second number of processor cycles. The second number of processor cycles may be less than or equal to the first number of processor cycles. For example, the level one memory 104 may be a serially accessed cache memory that has a tag array and a data array, with the tag array being read first and the data array read after the tag array. The first portion 108 of the level two memory 112 may not include a tag array and may therefore be read in fewer processor cycles than (or an equal number of cycles as) the level one memory 104.

Further, the second data read latency of the first portion 108 of the level two memory 112 is less than a third data read latency of at least one other portion of the level two memory 112, such as the second portion 110 of the level two memory 112. The second data read latency may be less than the third data read latency because the first portion 108 of the level two memory 112 includes shorter wire lengths and is closer to the input port 206 than other portions of the level two memory 112. For example, address lines 212 to address memory elements in the sub-array 208 may have a shorter address line length than address lines in at least one other portion of the level two memory 112, such as address lines 216, 220, and 224. In addition, the number of address lines 212 is less than the total number of address lines 212, 216, 220, and 224 within the level two memory 112.

Because wires to propagate signals in the first portion 108 of the level two memory 112, such as the address lines 212, may be shorter than wires to propagate signals in other portions of the level two memory 112, such as the address lines 216, 220, and 224, and because the sub-array 208 is closest to the input port 206, signals can be communicated over the shorter wires (e.g., the address lines 212) in less time than is needed to transmit signals along the longer wires (e.g., the address lines 216, 220, and 224). For example, signals that represent an address of data to be retrieved from the first portion 108 of the level two memory 112 may be communicated over the shorter address lines 212 in less time than is needed to transmit similar signals that represent an address of data to be retrieved from the second portion 110 of the level two memory 112 along the longer address lines 216, 220, and 224. It is therefore possible to specify a portion of the level two memory 112 as the first portion 108 of the level two memory 112 where there first portion may be accessed in an amount of time that is equal to or less than the amount of time required to access the level one memory 104.

The input port 206 may be configured to receive a level one (L1) memory access request 102 or a level two (L2) memory access request 202. The input port 206 may be coupled to the level one memory 104 and further coupled to the level two memory 112. The input port 206 may include a 2-to-1 multiplexer 204. The multiplexer 204 may be configured to receive an L1 memory access request 102 via a first signal line 203, an L2 memory access request 202 via a second signal line 205, and a status bit 226. The status bit 226 may be used as a control bit to determine whether an L1 memory access request 102 or an L2 memory access request 202 should be output from the multiplexer 204 and directed to the level two memory 112.

An output multiplexer 218 may be coupled to the level one memory 104 and coupled to the first portion 108 of the level two memory 112. The output multiplexer 218 may be coupled to the first portion 108 of the level two memory via a first signal line 229 (the first signal line 229 may include multiple data lines). The output multiplexer 218 may also coupled to the level one memory 104 via a second signal line 230 (the second signal line 230 may include multiple data lines). The output multiplexer 218 may be configured to output data 106 retrieved from the level one memory 104 or retrieved from the first portion 108 of the level two memory 112. For example, data may be retrieved from either the level one memory 104 or from the first portion 108 of the level two memory 112. After the data is retrieved from either the level one memory 104 or from the first portion 108 of the level two memory 112, the data may be provided to the output multiplexer 218 via the first signal line 229 or the second signal line 230. The output multiplexer 218 may determine whether to output data received from the level one memory 104 or to output data received from the first portion 108 of the level two memory 112 based on a value 228, such as a value indicating whether data requested in a memory access request is retrieved from the level one memory 104 or the first portion 108 of the level two memory 112. For example, the value 228 may be generated by control circuitry such as a cache control unit (not shown) to select the second signal line 230 in response to a cache hit at the level one memory 104 or to select the first signal line 229 in response to the data 106 being retrieved from the first portion 108 of the level two memory 112. As another example, a page may be assigned to the first portion 108 of the level two memory 112 and the value 228 may be maintained to select the first signal line 229 during successive accesses to the page as determined at a translation lookaside buffer (TLB), as described with respect to FIG. 4.

During operation, an L1 memory access request 102 may be received at the port 206 and at the level one memory 104. Alternatively, the L1 memory access request 102 may be selectively provided to only one of the level one memory 104 or the port 206, such as via a selection mechanism (not shown). When the status bit 226 indicates that the first portion 108 of the level two memory 112 is enabled to operate as an extension of the level one memory 104, the multiplexer 204 may output the L1 memory access request 102 so that the first portion 108 of the level two memory 112 may be accessed to determine whether a copy of data requested by the L1 memory access request 102 is stored within the first portion 108 of the level two memory 112. Because the first portion 108 of the level two memory 112 is enabled to operate as an extension of the level one memory 104, memory access requests directed to the level one memory 104, such as the L1 memory access request 102, may also be directed to the first portion 108 of the level two memory 112. The L1 memory access request 102 may therefore be serviced by either the level one memory 104 or the first portion 108 of the level two memory 112 as if the level one memory 104 or the first portion 108 of the level two memory 112 were a single memory system.

In a particular embodiment, the status bit 226 may be used as a control input to the multiplexer 204. The status bit 226 may be initially set to a first particular value when the apparatus 200 is initialized. The first particular value of the status bit 226 may cause the multiplexer 204 to output data that is received over the first signal line 203 and that carries an L1 memory access request 102. When the L1 memory access request 102 is received at the port 206, the multiplexer 204 may therefore output the L1 memory access request 102 based on a value of the status bit 226. So long as each L1 memory access request 102 results in a cache hit at either the level one memory 104 or the first portion 108 of the level two memory 112, the status bit 226 may remain unchanged. However, if the L1 memory access request 102 results in a cache miss at the level one memory 104 and at the first portion 108 of the level two memory 112, an L2 memory access request 202 may be sent to the level two memory 112. In order to send the L2 memory access request 202 to the level two memory 112, the status bit 226 may be changed to a second particular value. The second particular value of the status bit 226 may cause the multiplexer 204 to output data that is received at the multiplexer 204 via the second signal line 205 and that carries an L2 memory access request 202. When the L2 memory access request 202 is received at the port 206, the multiplexer 204 may therefore output the L2 memory access request 202 based on the value of the status bit 226. After the L2 memory access request 202 has been output from the multiplexer 204, the status bit 226 can then be returned to the first particular value. A memory access request may therefore be treated initially as an L1 memory access request 102 and subsequently treated as an L2 memory access request 202 at least partially in response to a cache miss occurring at the level one memory 104.

In a particular embodiment, the L2 memory access request 202 may be sent to the first portion 108 and sent to the second portion 110 in parallel. For example, the L2 memory access request 202 may be output from the multiplexer 204 and transmitted via the signal line 290 to the first set of selection elements 292. In such an example, the first portion 108 and the second portion 110 may operate as a single level two memory 112 for servicing the L2 memory access request 202. If the L2 memory access request 202 results in a cache hit, a cache control unit at the level two memory 112 may provide the requested data corresponding to the L2 memory access request 202 from the first portion 108 or to the second portion 110 of the level two memory 112. For example, the L2 data 296 may be output from the first portion 108 or from the second portion 110 via the output signal lines from first portion 108 and the second portion 110 that are coupled to the selection elements 294.

In an additional embodiment, the L1 memory access request 102 may be sent to the level one memory 104 and to the first portion 108 of the level two memory 112 while the L2 memory access request 202 is concurrently sent to the second portion 110 of the level two memory 112 via the signal line 290 and the first set of selection elements 292. In such an example, the L1 memory access request 102 and the L2 memory access request 202 are non-conflicting memory access requests that may be serviced concurrently.

In a particular embodiment, the level one memory 104 and the level two memory 112 may be embodied as cache memory composed of a plurality of cache lines. The level one memory 104 and the level two memory 112 may each include a cache control unit comprising logic to examine the contents of the respective caches. The contents of the level one memory 104 may be examined, for example, through the use of comparison logic that checks for a tag in a particular cache line that matches at least a portion of an address specified in the L1 memory access request 102. When such a cache line is identified, a cache hit occurs and the cache control unit may indicate that the data associated with the L1 memory access request 102 is present in the cache. When a cache line is not found, a cache miss occurs and the cache control unit may provide a miss indication.

For example, the level one memory 104 and the first portion 108 of the level two memory 112 may be searched for data specified in the L1 memory access request 102. If the data requested by the L1 memory access request 102 is present at the level one memory 104, a cache control unit at the level one memory 104 may output a value 228 via the second signal line 230 (e.g. the second signal line 230 may include multiple data lines for data and a specific line to indicate a cache hit or miss) indicating that the L1 memory access request 102 resulted in a cache hit at the level one memory 104. The value 228 may be sent to the output multiplexer 218 for use as a control so that the output multiplexer 218 will output data received from the level one memory 104. The cache control unit may then provide the data 106 corresponding to the L1 memory access request 102 from the level one memory 104 to the output multiplexer 218. Likewise, if the data 106 requested by the L1 memory access request 102 is present at the first portion 108 of the level two memory 112, a cache control unit at the level two memory 112 may output a value 228 via the first signal line 229 (the first signal line 229 may include multiple data lines for data and a specific line to indicate a cache hit or miss) indicating that the L1 memory access request 102 resulted in a cache hit at the first portion 108 of the level two memory 112. The cache control unit may then provide the requested data 106 corresponding to the L1 memory access request 102 from the first portion 108 of the level two memory 112 to the output multiplexer 218. The output multiplexer 218 provides the retrieved data from either the level one memory 104 or from the first portion 108 of the level two memory 112.

The apparatus 100 of FIG. 1 and the apparatus 200 of FIG. 2 may be incorporated into various electronic devices. For example, a processing device such as a digital signal processor may include means for storing data for a first level access at a multi-level access memory system, such as the level one memory 104, and means for storing data for a second level access at the multi-level memory system, such as the level two memory 112, where a portion (e.g. the first portion 108) of the means for storing data for the second level access is coupled to an input port and is addressable in parallel with the means for storing data for the first level access. In a particular embodiment, the apparatus 100 of FIG. 1 or the apparatus 200 of FIG. 2 may be integrated into at least one semiconductor die. The apparatus 100 of FIG. 1 or the apparatus 200 of FIG. 2 may further include a device such as set top box, a music player, a video player, an entertainment unit, a navigation device, a communications device, a personal digital assistant (PDA), a fixed location data unit, and a computer, into which the level one memory 104 and the level two memory 112 are integrated.

Figure 3:
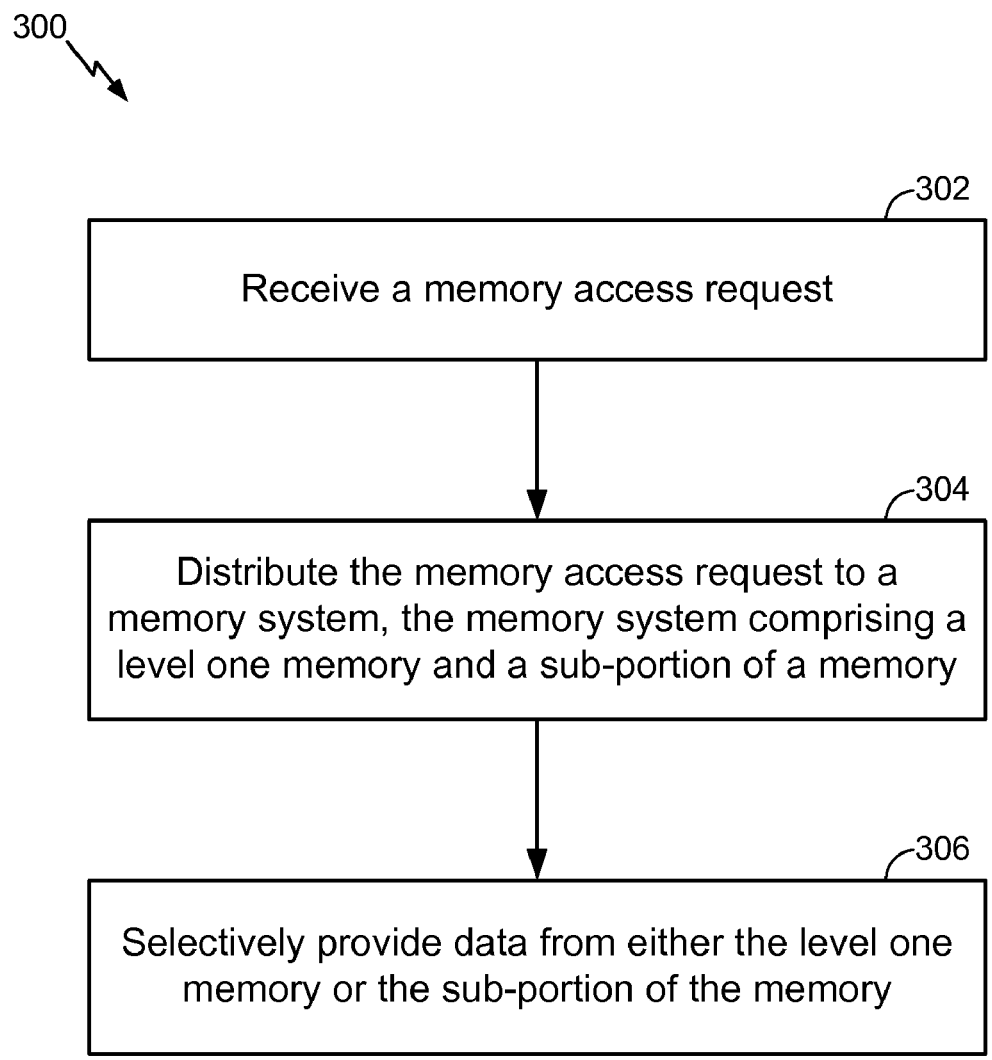
FIG. 3 is a flow chart of a particular illustrative embodiment of a method of accessing a level one memory and a sub-portion of memory.

Referring to FIG. 3, a flow chart of a particular illustrative embodiment of a method of accessing a portion of a level two memory and a level one memory is depicted and is generally designated 300. The method 300 includes receiving a memory access request, at 302. The memory access request may include a memory address of data to be retrieved in response to the memory access request. For example, in FIG. 1, the memory access request 102 is received by a memory system 114 including a level one memory 104 that is addressable in parallel with a first portion 108 of a level two memory 112.

Moving to 304, the method 300 includes distributing the memory access request to a memory system. The memory system includes a level one memory and a sub-portion of a memory. For example, in FIG. 1, the memory access request 102 is distributed to the memory system 114. The memory system 114 includes a first level memory and a first portion of a second level memory. Although the memory access request 102 may be distributed to the level one memory 104 and to the first portion 108 of the level two memory 112, the memory access request 102 may alternatively be distributed to only one of the level one memory 104 and the first portion 108 of the level two memory 114. For example, if data specified in a first memory access request is found in the first level memory 104, all subsequent memory access requests may be distributed only to the first level memory 104 until a cache miss occurs. Thus, the memory access requests are distributed to a system that includes both a level one memory and a sub-portion of a memory, and the memory access requests may be distributed within the memory system in a number of ways.

The method 300 includes selectively providing data from the level one memory or the sub-portion of the memory, at 306. For example, in FIG. 1, data 106 is provided from the level one memory 104 or from the first portion 108 of the level two memory 112.

In a particular embodiment, the method also includes writing a data value to the level one memory or to the sub-portion of the memory. For example, a data word to be stored for level one access may be provided to a selected one of the level one memory 104 or to the first portion 208 of the level two memory 112 via the input port 206. Writing the data word to the first portion 208 of the level two memory 112 may take a same number of processor cycles as writing the data word to the level one memory 104. A determination of whether to store the data word at the level one memory or at the sub-portion of the memory may be based on an address of the data word.

Figure 4:
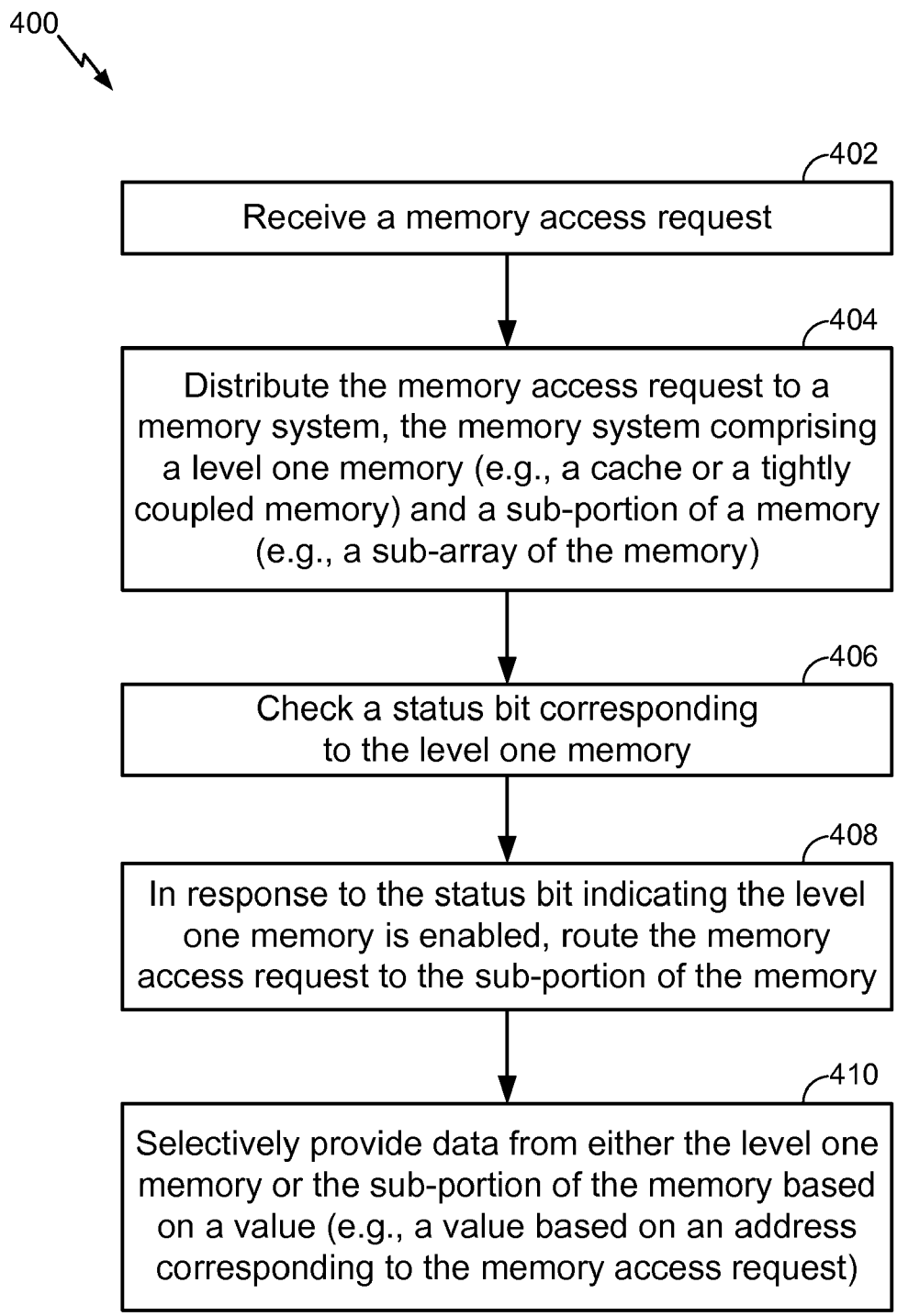
FIG. 4 is a flow chart of a second illustrative embodiment of a method of accessing a level one memory and a sub-portion of memory.

Referring to FIG. 4, a flow chart of a particular illustrative embodiment of a method of accessing a portion of a level two memory and a level one memory is depicted and generally designated 400. The method 400 includes receiving a memory access request, at 402. For example, in FIG. 2, the L1 memory access request 102 may be received by the apparatus 200.

The method 400 includes distributing the memory access request to a memory system, at 404. The memory system includes a level one memory and a sub-portion of a memory. The level one memory may be embodied as a cache or as a tightly coupled memory (TCM). Further, the sub-portion of the memory may be embodied as a sub-array of an array in a memory that includes multiple arrays or multiple sub-arrays. For example, in FIG. 2, the L1 memory access request 102 may be distributed to the level one memory 104 and to the first portion 108 of the level two memory 112 via the port 206.

Moving to 406, the method 400 includes checking a status bit corresponding to the level one memory. The status bit may be used to determine whether a memory access request should be directed to a portion of a level two memory that operates as an extension of a level one memory or directed to the level two memory. For example, in FIG. 2, the status bit 226 is used as a control bit and the value of the status bit 226 is checked by the multiplexer 204 to determine whether the memory access request 102 should be directed to the first portion 108 of the level two memory 112 that operates as an extension of the level one memory 104 or directed to the second portion 110 of the level two memory 112.

The method 400 further includes routing the memory access request to the sub-portion of the memory in response to the status bit indicating the sub-portion of the memory is enabled, at 408. For example, in FIG. 2, the L1 memory access request 102 is routed via the port 206 to the first portion 108 of the level two memory 112 when the status bit 226 indicates that the first portion 108 of the level two memory 112 is enabled to serve as an extension of the level one memory 104. Because the first portion 108 of the level two memory 112 is enabled to serve as an extension of the level one memory 104, memory access requests directed to the level one memory 104, such as the L1 memory access request 102, are also directed to the first portion 108 of the level two memory 112. The L1 memory access request 102 may therefore be serviced by either the level one memory 104 or the first portion 108 of the level two memory 112 as if the level one memory 104 or the first portion 108 of the level two memory 112 were a single memory system.

Moving to 410, the method includes selectively providing data from the level one memory or from the sub-portion of the memory. The memory access that is responsive to the memory access request may occur during a time period (e.g., one or more processor cycles) independent of whether the memory access occurs at the level one memory or at the sub-portion of the memory. In addition, data may be selectively provided from the level one memory or the sub-portion of the memory based on a value that indicates whether the data is stored at the level one memory or at the sub-portion of the memory. The value may be based on an address corresponding to the memory access request. For example, the method may include selectively retrieving the data from either the level one memory or the sub-portion of the memory based on an address of a memory access request. To illustrate, in FIG. 2, the data 106 may be selectively retreived from the level one memory 104 or from the first portion 108 of the level two memory 112. The data 106 may be selectively retreived from the level one memory 104 or from the first portion 108 of the level two memory 112 based on the value 228 provided to the output multiplexer 218. The value 228 may be based on an address specified in the L1 memory access request 102, such as a value indicating whether data specified by the address contained in the L1 memory access request 102 was found in the level one memory 104 or found in the first portion 108 of the level two memory 112. The data 106 may be provided from the level one memory 104 or from the first portion 108 of the level two memory 112. In a particular embodiment, an amount of time to provide the data 106 when the data 106 is located at the first portion 108 of the level two memory 112 may be a same number of processor cycles as when the data 106 is located at the level one memory 104. In another embodiment, an amount of time to provide the data 106 when the data 106 is located at the first portion 108 of the level two memory 112 may be a fewer number of processor cycles than when the data 106 is located at the level one memory 104.

In an illustrative embodiment, the value 228 can be maintained while a same page of a translation lookaside buffer (TLB) is accessed. While the same TLB page is being accessed, power may be saved by accessing only one of the level one memory 104 or the first portion 108 of the level two memory 112. The value 228 may be updated when the page changes. For example, a usage model may include assigning a separate page only to the first portion 108 of the level two memory 112. The first portion 108 of the level two memory 112 may be used for consecutive memory accesses at the assigned page, and when the assigned page is exited another portion of the memory may be accessed.

The methods of FIGS. 3 and 4 may be performed at a processor integrated into an electronic device. For example, as will be described with respect to FIG. 5, a memory access request may be distributed by a computer or other electronic device and data may be provided from a level one memory or a sub-portion of a memory by a computer or other electronic device. Alternatively, or in addition, one of skill in the art will recognize that the method 300 of FIG. 3 and the method 400 of FIG. 4 may be implemented or initiated by a field programmable gate array (FPGA), an application-specific integrated circuit (ASIC), a central processing unit (CPU), a digital signal processor (DSP), a controller, another hardware device, or any combination thereof.

Figure 5:
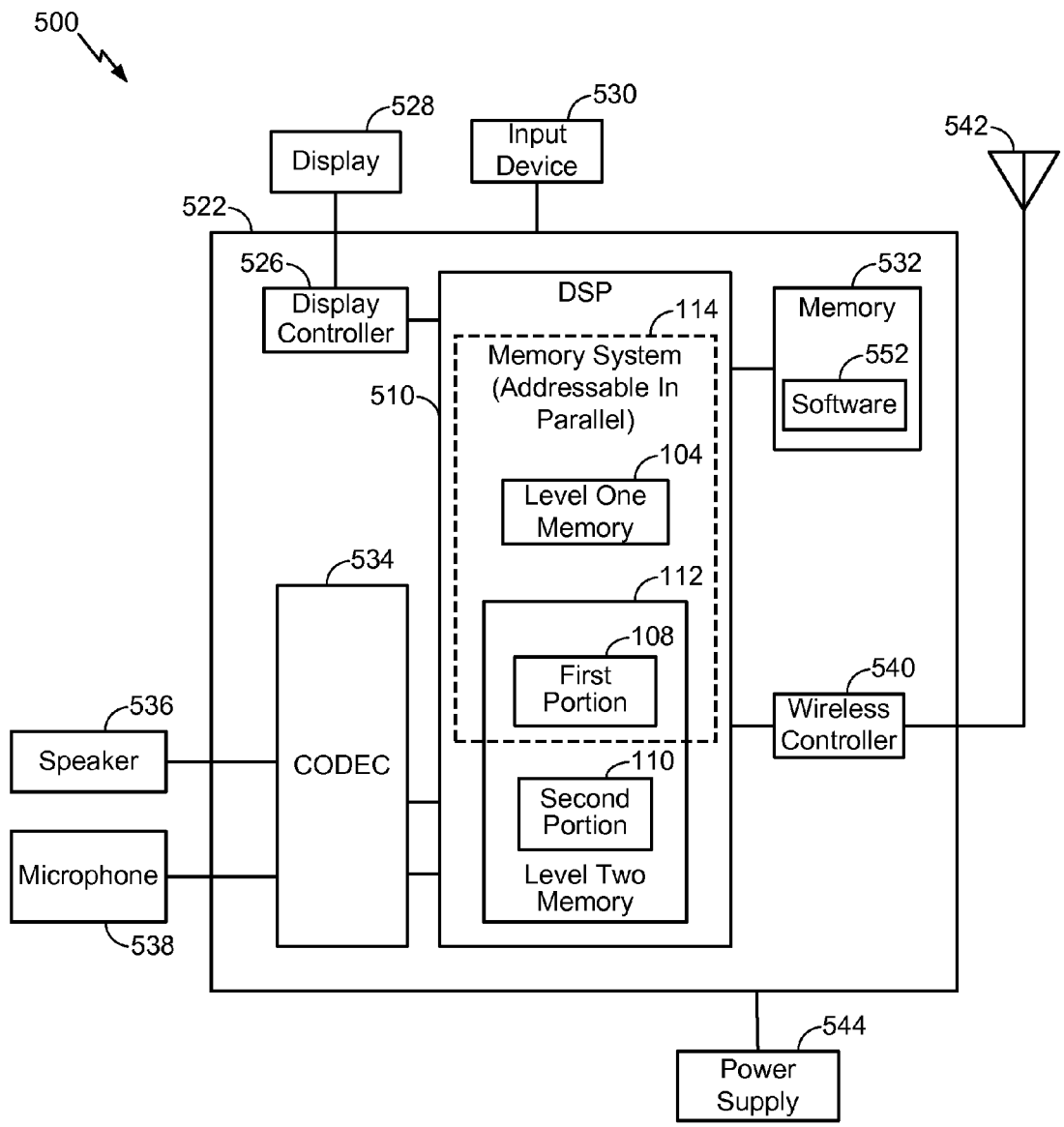
FIG. 5 is a block diagram of portable device configured to access a portion of a level two memory and a level one memory.

Referring to FIG. 5, a block diagram of a particular illustrative embodiment of an electronic device configured to access a portion of a level two memory and a level one memory is depicted and generally designated 500. The device 500 includes a processor, such as a digital signal processor (DSP) 510 that is coupled to a memory 532. The DSP 510 includes a level one memory 104 and a level two memory 112. The level two memory 112 includes a first portion 108 of the level two memory 112 and a second portion 110 of the level two memory 112. The level one memory 104 and the first portion 108 of the level two memory 112 may form a memory system 114. In an alternative embodiment, the level one memory 104 and the level two memory 112, including the first portion 108 of the level two memory 112 and the second portion 110 of the level two memory 112, may be located in other memory that is external to the DSP 510, such as the memory 532. In an illustrative example, the level one memory 104 and the level two memory 112 operate in accordance with one or more of the methods of FIGS. 3-4, or any combination thereof.

FIG. 5 also shows a display controller 526 that is coupled to the digital signal processor 510 and to a display 528. A coder/decoder (CODEC) 534 can also be coupled to the DSP 510. A speaker 536 and a microphone 538 can be coupled to the CODEC 534.

FIG. 5 also indicates that a wireless controller 540 can be coupled to the DSP 510 and to a wireless antenna 542. In a particular embodiment, the DSP 510 (including the level one memory 104 and level two memory 112), the display controller 526, the memory 532, the CODEC 534, and the wireless controller 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, and the power supply 544 are external to the system-on-chip device 522. However, each of the display 528, the input device 530, the speaker 536, the microphone 538, the wireless antenna 542, and the power supply 544 can be coupled to a component of the system-on-chip device 522, such as an interface or a controller.

Those of skill would further appreciate that the various illustrative logical blocks, configurations, modules, circuits, and algorithm steps described in connection with the embodiments disclosed herein may be implemented as electronic hardware, computer software executable by a processing unit, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
    a level one cache;
    a level two memory, wherein in a first mode a first portion of the level two memory is configured as an extension of the level one cache, and in a second mode the first portion of the level two memory is configured as a portion of the level two memory and is excluded from operating as an extension of the level one cache; and
    control logic operable to route a memory access request to the first portion of the level two memory in parallel with the level one cache conditioned upon an indication that the first mode is enabled.

2. The apparatus of claim 1, wherein in the first mode a first data read latency of the level one cache is at least as large as a second data read latency of the first portion of the level two memory.

3. The apparatus of claim 2, wherein the second data read latency of the first portion of the level two memory is less than a third data read latency of at least one other portion of the level two memory.

4. The apparatus of claim 2, wherein the level two memory is a level two cache.

5. The apparatus of claim 1, wherein the level two memory is one of a tightly coupled memory and a cache.

6. The apparatus of claim 1, wherein the first portion of the level two memory is physically located proximal to the level one cache.

7. The apparatus of claim 6, wherein the first portion of the level two memory comprises a single sub-array of the level two memory.

8. The apparatus of claim 7, wherein the single sub-array has a first address line length that is shorter than a second address line length of a second portion of the level two memory.

9. The apparatus of claim 1, further comprising an output multiplexer coupled to the first portion of the level two memory and coupled to the level one cache.

10. The apparatus of claim 1, integrated in a semiconductor die.

11. The apparatus of claim 10, further comprising a device selected from the group consisting of a set top box, a music player, a video player, an entertainment unit, a navigation device, a communications device, a personal digital assistant (PDA), a fixed location data unit, and a computer, into which the level one cache and the level two memory are integrated.

12. The apparatus of claim 1, further comprising control logic operable to:
    determine a value of a status bit associated with an input port in response to receiving the memory access request, wherein the input port is coupled to the first portion of the level two memory and wherein the value of the status bit indicates whether the first mode is enabled.

13. A method comprising:
    receiving a memory access request;
    determining whether a sub-portion of a level two memory is configured as an extension of a level one memory;
    routing the memory access request in parallel to each of the level one memory and the sub-portion of the level two memory conditioned upon a determination that the sub-portion of the level two memory is configured as an extension of the level one memory; and
    providing data corresponding to the memory access request in response to receiving the memory access request.

14. The method of claim 13, wherein the data is provided from a selected one of the level one memory and the sub-portion of the level two memory based on whether the data corresponding to the memory access request is stored at the level one memory or at the sub-portion of the level two memory.

15. The method of claim 13, wherein the data is selectively provided from one of the level one memory and the sub-portion of the level two memory based on an output multiplexer status value that indicates whether the data is stored at the level one memory or at the sub-portion of the level two memory.

16. The method of claim 13, wherein a memory access responsive to the memory access request occurs during a time period that is independent of whether the memory access occurs at the level one memory or at the sub-portion of the level two memory.

17. The method of claim 13, wherein the level one memory is one of a cache and a tightly coupled memory.

18. The method of claim 13, wherein determining whether the sub-portion of the level two memory is configured as the extension of the level one memory comprises determining a value of a status bit corresponding to the sub-portion of the level two memory, wherein the value of the status bit is one of a first value and a second value, wherein the first value indicates that the sub-portion of the level two memory is configured as an extension of the level one memory, and wherein the second value indicates that the sub-portion of level two memory is configured as level two memory and is excluded from operating as an extension of the level one memory.

19. The method of claim 13, further comprising retrieving the data from a selected one of the level one memory and the sub-portion of the level two memory, wherein the selection is based on an address associated with the memory access request.

20. The method of claim 13, wherein providing the data in response to receiving the memory access request is performed by a processor integrated into an electronic device.

21. An apparatus comprising:
  means for storing data for a first level access at a multi-level access memory system;
  means for storing data for a second level access at the multi-level memory system, wherein:
    in a first mode a first portion of the means for storing data for the second level access is configured as an extension of the means for storing data for the first level access; and
    in a second mode the first portion of the means for storing data for the second level access is configured as a portion of the means for storing data for the second level access and is excluded from operating as an extension of the means for storing data for the first level access; and
  means for routing a memory access request to the first portion of the means for storing data for the second level access in parallel with the means for storing data for the first level access conditioned upon a determination that the first mode is enabled.

22. The apparatus of claim 21, integrated in at least one semiconductor die.

23. The method of claim 18, further comprising setting the value of the status bit based on a cache hit associated with the level one memory, wherein the value of the status bit is set to indicate that the second mode is enabled in response to the cache hit associated with the level one memory.

24. The apparatus of claim 21, further comprising:
  means for determining whether the first mode is enabled.

25. The apparatus of claim 12, wherein the value of the status bit is one of a first value and a second value, wherein the first value is the indication that the first mode is enabled and wherein the second value is an indication that the second mode is enabled.

26. The apparatus of claim 12, wherein the memory access request is one of a level one memory access request and a level two memory access request, and wherein the input port is configured to, in response to the status bit indicating that the second mode is enabled:
  block the memory access request from the first portion of the level two memory conditioned upon the memory access request being the level one memory access request; and
  route the memory access request to the first portion of the level two memory conditioned upon the memory access request being the level two memory access request.

27. The apparatus of claim 26, wherein the input port is further configured to, in response to the status bit indicating that the first mode is enabled, block the memory access request from the first portion of the level two memory conditioned upon the memory access request being the level two memory access request.

* * * * *